US009844095B2

(12) United States Patent
Urabayashi et al.

(10) Patent No.: US 9,844,095 B2
(45) Date of Patent: *Dec. 12, 2017

(54) MOBILE COMMUNICATION SYSTEM, BASE STATION, AND USER TERMINAL

(71) Applicant: KYOCERA CORPORATION, Kyoto (JP)

(72) Inventors: Hiroyuki Urabayashi, Yokohama (JP); Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,453

(22) Filed: Jun. 8, 2017

(65) Prior Publication Data

US 2017/0273138 A1 Sep. 21, 2017

Related U.S. Application Data

(63) Continuation of application No. 15/252,649, filed on Aug. 31, 2016, now Pat. No. 9,712,982, which is a (Continued)

(30) Foreign Application Priority Data

Mar. 20, 2014 (JP) ................. 2014-058040

(51) Int. Cl.
*H04W 68/00* (2009.01)
*H04W 76/04* (2009.01)
*H04W 48/12* (2009.01)
*H04W 72/00* (2009.01)
*H04W 88/12* (2009.01)

(52) U.S. Cl.
CPC ......... *H04W 76/048* (2013.01); *H04W 48/12* (2013.01); *H04W 72/005* (2013.01); *H04W 88/12* (2013.01)

(58) Field of Classification Search
CPC ............. H04W 72/042; H04W 76/048; H04W 74/0833; H04W 4/06; H04W 72/0413;
(Continued)

(56) References Cited

U.S. PATENT DOCUMENTS

2011/0194484 A1 8/2011 Lee et al.
2012/0064932 A1* 3/2012 Lim ...................... H04W 4/005
455/509
(Continued)

FOREIGN PATENT DOCUMENTS

WO 2012/149322 A1 11/2012

OTHER PUBLICATIONS

International Search Report issued in PCT/JP2015/058582; dated Jun. 16, 2015.
(Continued)

*Primary Examiner* — Nimesh Patel
(74) *Attorney, Agent, or Firm* — Studebaker & Brackett PC

(57) ABSTRACT

A user terminal according to one aspect executes a first and second DRX operations. The first DRX operation is an operation of discontinuously monitoring first control information, which is transmitted from the base station via PDCCH, using a C-RNTI that uniquely identifies the user terminal in a cell of the base station. The second DRX operation is an operation of discontinuously monitoring second control information, which is transmitted from the base station via the PDCCH, using a group RNTI assigned to a terminal group including the user terminal. The user terminal monitors the first control information in a first ON duration for the first DRX operation, and monitors the second control information in a second ON duration for the second DRX operation, the second ON duration being independent of the first ON duration.

2 Claims, 12 Drawing Sheets

Related U.S. Application Data continuation of application No. PCT/JP2015/058582, filed on Mar. 20, 2015.

(58) Field of Classification Search
CPC .......... H04W 74/006; H04W 72/1289; H04W 72/04; H04W 48/12; H04W 72/1278; H04W 74/002; H04W 72/005; H04W 76/002; H04W 76/025; H04W 88/02; H04W 76/046; H04W 84/045; H04W 8/005; H04W 88/06; H04W 16/14; H04W 36/0088; H04W 52/244; H04W 72/085; H04W 36/18; H04W 4/08

See application file for complete search history.

(56) References Cited

U.S. PATENT DOCUMENTS

| | | |
|---|---|---|
| 2012/0275366 A1 | 11/2012 | Anderson et al. |
| 2013/0183987 A1 | 7/2013 | Vrzie et al. |
| 2013/0250771 A1 | 9/2013 | Yu et al. |
| 2014/0036747 A1 | 2/2014 | Nory et al. |
| 2015/0124671 A1 | 5/2015 | Tabet et al. |

OTHER PUBLICATIONS

Written Opinion issued in PCT/JP2015/058582; dated Jun. 16, 2015.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.0.0; Dec. 2013; pp. 1-208; Release 12; 3GPP Organizational Partners.

Huawei, HiSilicon; Group Scheduling—alternative solution for group communication; 3GPP TSG-RAN WG2 #85; R2-140265; Feb. 10-14, 2014; pp. 1-4; Prague, Czech Republic.

CMCC; Discussion on L1 signaling design for TDD eIMTA; 3GPP TSG-RAN WG1 Meeting #74bis; R1-134568; Oct. 7-11, 2013; pp. 1-4; Guangzhou, China.

Alcatel-Lucent, Alcatel-Lucent Shanghai Bell; Further discussions on DCI overhead reduction for carrier aggregation; 3GPP TSG-RAN WG1 Meeting #66bis; R1-113309; Oct. 10-14, 2011; pp. 1-5; Zhuhai, China.

Intel Corporation; Signaling mechanism for TDD UL/DL reconfiguration; 3GPP TSG-RAN WG1 #74; R1-132926; Aug. 19-23, 2013; pp. 1-5; Barcelona, Spain.

Panasonic; Reconfiguration message transmission details; 3GPP TSG-RAN WG1 Meeting 74; R1-133204; Aug. 19-23, 2013; pp. 1-4; Barcelona, Spain.

An Office Action; "Notice of Reason for Rejection," issued by the Japanese Patent Office on Dec. 6, 2016, which corresponds to Japanese Patent Application No. 2016-508833 and is related to U.S. Appl. No. 15/252,649; with English language Concise Explanation.

The extended European search report issued by the European Patent Office on Oct. 5, 2017, which corresponds to European Patent Application No. 15764896.5—1857 and is related to U.S. Appl. No. 15/617,453.

\* cited by examiner

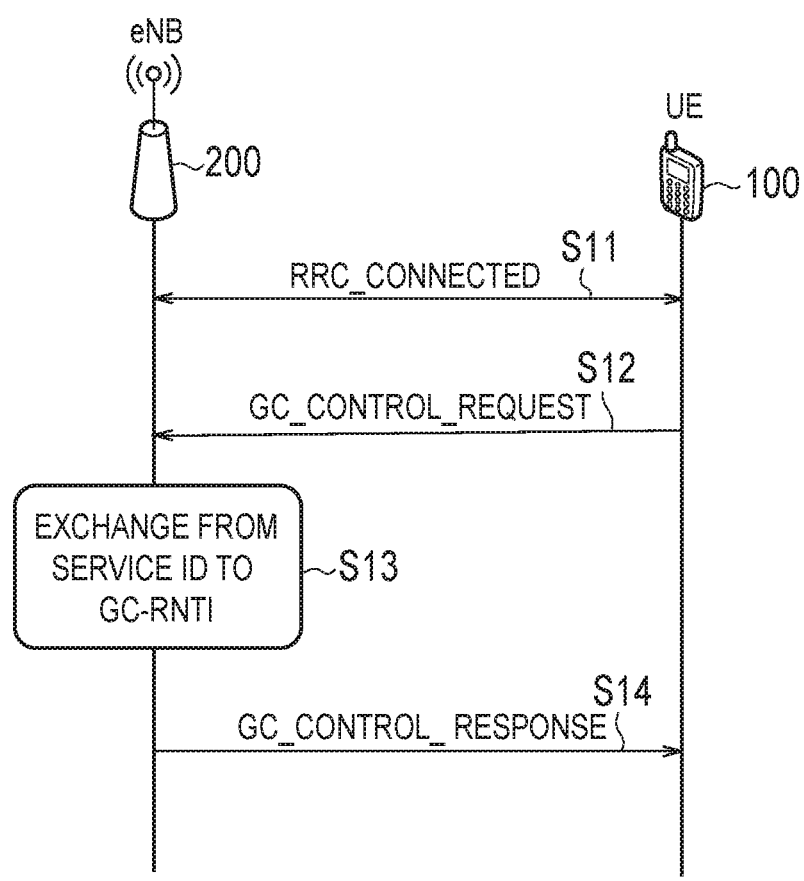

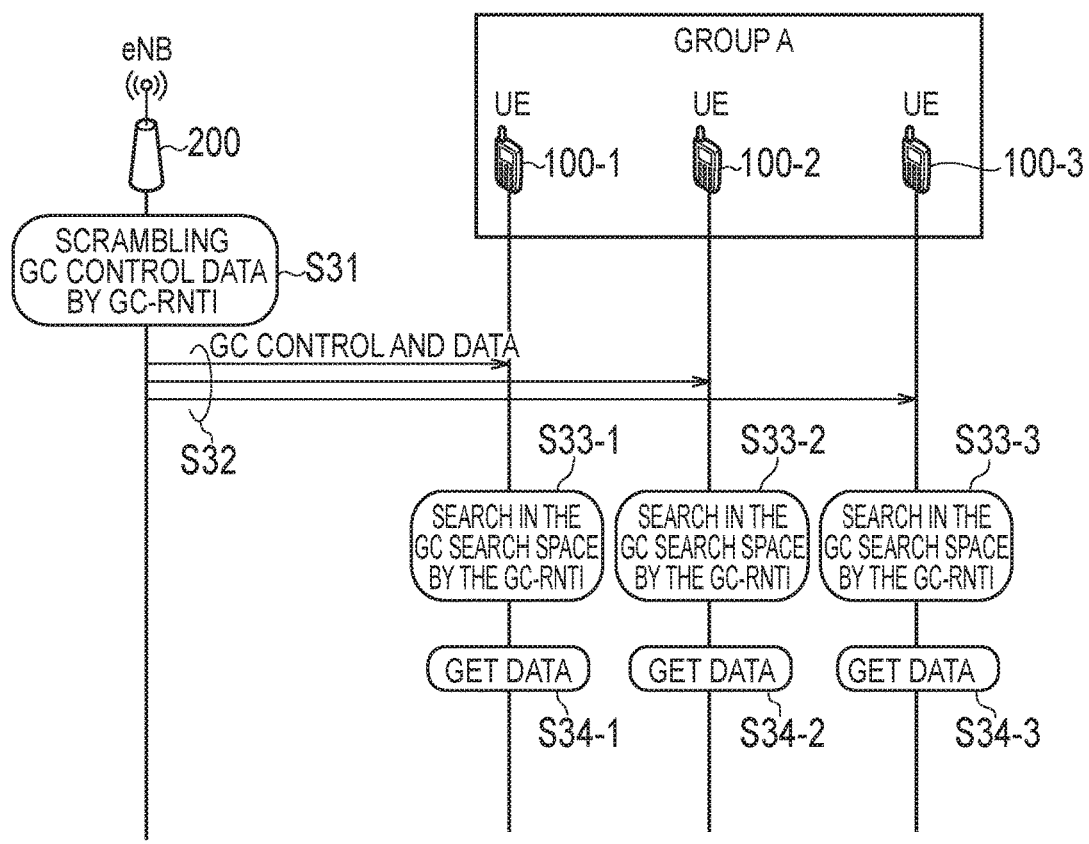

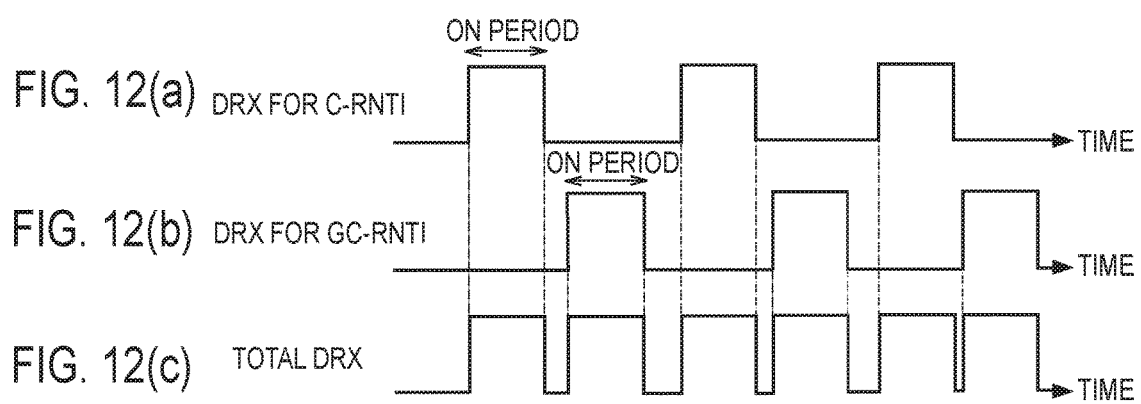

MOBILE COMMUNICATION SYSTEM, BASE STATION, AND USER TERMINAL

CROSS REFERENCE TO RELATED APPLICATIONS

This application is a Continuation Application of U.S. patent application Ser. No. 15/252,649, filed Aug. 31, 2016, which is a Continuation Application of International Patent Application No. PCT/JP2015/058582, filed Mar. 20, 2015, which claims benefit of Japanese Patent Application No. 2014-058040, filed Mar. 20, 2014, the entire contents of which are incorporated herein by reference.

TECHNICAL FIELD

The present disclosure relates to a mobile communication system into which a group communication function is introduced.

BACKGROUND ART

In 3rd Generation Partnership Project (3GPP) that is a mobile communication system standardization project, a Multimedia Broadcast Multicast Service (MBMS) has been established (see Non-Patent Literature 1). In the MBMS, a plurality of user terminals receives an MBMS service that is provided from a network in a multicast or broadcast manner. For example, the MBMS service is a broadcast video delivery.

In 3GPP, standardization for newly introducing a group communication function is scheduled to be conducted in Release 12. For example, the group communication is a group call (voice over Internet protocol (VoIP)) based on packet communication. In the group communication, basically, unicasting is applied to uplink communication, and unicasting or multicasting is applied to downlink communication.

CITATION LIST

Non Patent Literature

Non patent Literature 1: 3GPP Technical Specification "TS36.300 V12.0.0, " Jan. 10, 2014

SUMMARY

In an embodiment according to the present disclosure, a user terminal is configured to communicate with a base station and comprises a controller configured to execute a first discontinuous reception (DRX) operation and a second DRX operation, where the first DRX operation is an operation of discontinuously monitoring first control information, which is transmitted from the base station via a physical downlink control channel (PDCCH), using a cell-radio network temporary identifier (C-RNTI) that uniquely identifies the user terminal in a cell of the base station. The second DRX operation is an operation of discontinuously monitoring second control information, which is transmitted from the base station via the PDCCH, using a group RNTI assigned to a terminal group including the user terminal. The controller is configured to monitor the first control information in a first ON duration for the first DRX operation, and to monitor the second control information in a second ON duration for the second DRX operation, the second ON duration being independent of the first ON duration. The controller is further configured to execute a process of receiving third control information, which is transmitted from the base station via the PDCCH, using a fixed RNTI that predefined in a system, wherein the third control information includes information indicating allocation of PDSCH resources. The PDSCH resources include a plurality of service identifiers, where each service identifier identifies a multicast service provided by the base station; and plural pieces of scheduling information corresponding to the service identifiers on a one-to-one basis. The controller is further configured to receive the service identifiers and the plural pieces of scheduling information, based on the third control information received using the fixed RNTI.

In another embodiment according to the present disclosure, a device to be equipped in a user terminal is configured to communicate with a base station and comprises at least one processor communicatively coupled to a memory, the at least one processor configured to execute a first discontinuous reception (DRX) operation and a second DRX operation. The first DRX operation is an operation of discontinuously monitoring first control information, which is transmitted from the base station via a physical downlink control channel (PDCCH), using a cell-radio network temporary identifier (C-RNTI) that uniquely identifies the user terminal in a cell of the base station. The second DRX operation is an operation of discontinuously monitoring second control information, which is transmitted from the base station via the PDCCH, using a group RNTI assigned to a terminal group including the user terminal. The at least one processor is configured to monitor the first control information in a first ON duration for the first DRX operation, and to monitor the second control information in a second ON duration for the second DRX operation, the second ON duration being independent of the first ON duration. The at least one processor is further configured to execute a process of receiving third control information, which is transmitted from the base station via the PDCCH, using a fixed RNTI that predefined in a system, wherein the third control information includes information indicating allocation of PDSCH resources. The PDSCH resources include a plurality of service identifiers, where each service identifier identifies a multicast service provided by the base station; and plural pieces of scheduling information corresponding to the service identifiers on a one-to-one basis, and the at least one processor is further configured to receive the service identifiers and the plural pieces of scheduling information, based on the third control information received using the fixed RNTI.

BRIEF DESCRIPTION OF DRAWINGS

FIG. 7 is a sequence diagram illustrating an operation when an eNB allocates a GC-RNTI according to the first embodiment.

FIG. 9 is a sequence diagram illustrating a group communication operation according to the first embodiment.

FIGS. 12(a) to 12(c) are timing charts illustrating an operation according to a second modified example of the first embodiment.

DESCRIPTION OF EMBODIMENTS

[Overview of Embodiments]

Figure 1:
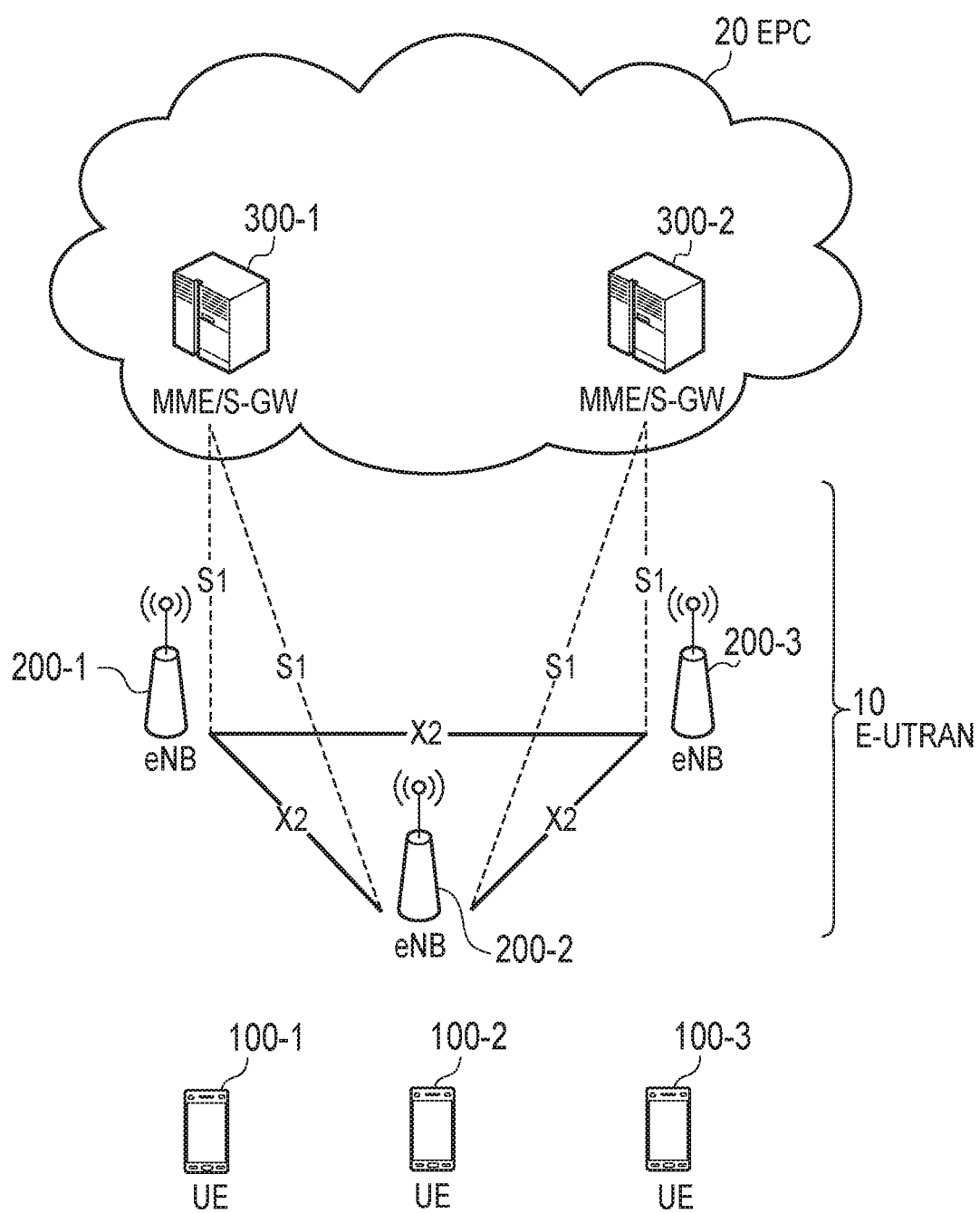
FIG. 1 is a configuration diagram illustrating an LTE system according to first to third embodiments.

A user terminal according to an embodiment is configured to communicate with a base station. The user terminal includes a controller configured to execute a first discontinuous reception (DRX) operation and a second DRX operation. The first DRX operation is an operation of discontinuously monitoring first control information, which is transmitted from the base station via a physical downlink control channel (PDCCH), using a cell-radio network temporary identifier (C-RNTI) that uniquely identifies the user terminal in a cell of the base station. The second DRX operation is an operation of discontinuously monitoring second control information, which is transmitted from the base station via the PDCCH, using a group RNTI assigned to a terminal group including the user terminal. The controller is configured to monitor the first control information in a first ON duration for the first DRX operation, and to monitor the second control information in a second ON duration for the second DRX operation, the second ON duration being independent of the first ON duration.

In an embodiment, the second control information is allocated in a common search space of the PDCCH.

In an embodiment, the controller is further configured to execute a process of receiving third control information, which is transmitted from the base station via the PDCCH, using a fixed RNTI that predefined in a system.

In an embodiment, the third control information includes information indicating allocation of physical downlink shared channel (PDSCH) resources. A plurality of service identifiers and plural pieces of scheduling information are allocated in the PDSCH resources, the plural pieces of scheduling information corresponding to the service identifiers on a one-to-one basis.

In an embodiment, the controller is further configured to receive the service identifiers and the plural pieces of scheduling information, based on the third control information received using the fixed RNTI.

In an embodiment, the controller is further configured to execute a process of receiving, from the base station, a message including a plurality of service identifiers and a plurality of group RNTIs, the group RNTIs corresponding to the service identifiers on a one-to-one basis. The message is transmitted to a plurality of user terminals including the user terminal.

In an embodiment, a device to be equipped in a user terminal configured to communicate with a base station, includes at least one processor configured to execute a first discontinuous reception (DRX) operation and a second DRX operation. The first DRX operation is an operation of discontinuously monitoring first control information, which is transmitted from the base station via a physical downlink control channel (PDCCH), using a cell-radio network temporary identifier (C-RNTI) that uniquely identifies the user terminal in a cell of the base station. The second DRX operation is an operation of discontinuously monitoring second control information, which is transmitted from the base station via the PDCCH, using a group RNTI assigned to a terminal group including the user terminal. The at least one processor is configured to monitor the first control information in a first ON duration for the first DRX operation, and to monitor the second control information in a second ON duration for the second DRX operation, the second ON duration being independent of the first ON duration.

In an embodiment, a user terminal includes a controller configured to execute a process of receiving control information, which is transmitted from a base station via a PDCCH, using a fixed RNTI that predefined in a system. The control information includes information indicating allocation of physical downlink shared channel (PDSCH) resources. A plurality of service identifiers and plural pieces of scheduling information are allocated in the PDSCH resources, the plural pieces of scheduling information corresponding to the service identifiers on a one-to-one basis. The controller is further configured to receive the service identifiers and the plural pieces of scheduling information, based on the control information received using the fixed RNTI.

In an embodiment, a device to be equipped in a user terminal, includes at least one processor configured to execute a process of receiving control information, which is transmitted from a base station via a PDCCH, using a fixed RNTI that predefined in a system. The control information includes information indicating allocation of physical downlink shared channel (PDSCH) resources. A plurality of service identifiers and plural pieces of scheduling information are allocated in the PDSCH resources, the plural pieces of scheduling information corresponding to the service identifiers on a one-to-one basis. The at least one processor is further configured to receive the service identifiers and the plural pieces of scheduling information, based on the control information received using the fixed RNTI.

In an embodiment, a base station includes a controller configured to execute a process of transmitting control information, which is transmitted to user terminals via a PDCCH, using a fixed RNTI that predefined in a system. The control information includes information indicating allocation of physical downlink shared channel (PDSCH) resources. The controller allocates a plurality of service identifiers and plural pieces of scheduling information into the PDSCH resources, the plural pieces of scheduling information corresponding to the service identifiers on a one-to-one basis.

In an embodiment, a device to be equipped in a base station includes at least one processor configured to execute a process of transmitting control information, which is transmitted to user terminals via a PDCCH, using a fixed RNTI that predefined in a system. The control information includes information indicating allocation of physical downlink shared channel (PDSCH) resources. The at least one processor allocates a plurality of service identifiers and plural pieces of scheduling information into the PDSCH resources, the plural pieces of scheduling information corresponding to the service identifiers on a one-to-one basis.

[First Embodiment]

Hereinafter, exemplary embodiments when the present disclosure is applied to an LTE system that is a mobile communication system based on the 3GPP standard will be described.

(1) System Configuration

A system configuration of an LTE system according to the first embodiment will be described below. FIG. 1 is a configuration diagram illustrating the LTE system according to the first embodiment.

The LTE system according to the first embodiment includes user equipments (UEs) 100, an evolved-UMTS terrestrial radio access network (E-UTRAN) 10, and an evolved packet core (EPC) 20 as illustrated in FIG. 1.

The UE 100 corresponds to a user terminal. The UE 100 is a mobile communication apparatus, and performs radio communication with a cell (a serving cell). A configuration of the UE 100 will be described later.

The E-UTRAN 10 corresponds to a radio access network. The E-UTRAN 10 includes evolved Node-Bs (eNBs) 200. The eNB 200 corresponds to a base station. The eNBs 200 are connected to one another via an X2 interface. A configuration of the eNB 200 will be described later.

The eNB 200 manages one or more cells, and performs radio communication with the UE 100 that has established a connection with its own cell. The eNB 200 has a radio resource management (RRM) function, a user data routing function, a measurement control function for mobility control/scheduling, and the like. A "cell" is used as not only a term indicating a minimum unit of a radio communication area but also a term indicating a function of performing radio communication with the UE 100.

The EPC 20 corresponds to a core network. The EPC 20 includes a mobility management entity (MME)/serving-gateway (S-GW) 300. The MME performs various kinds of mobility controls on the UE 100. The SGW performs user data transfer control. The MME/S-GW 300 is connected with the eNB 200 via an S1 interface. The E-UTRAN 10 and the EPC 20 constitute a network of the LTE system.

Figure 2:
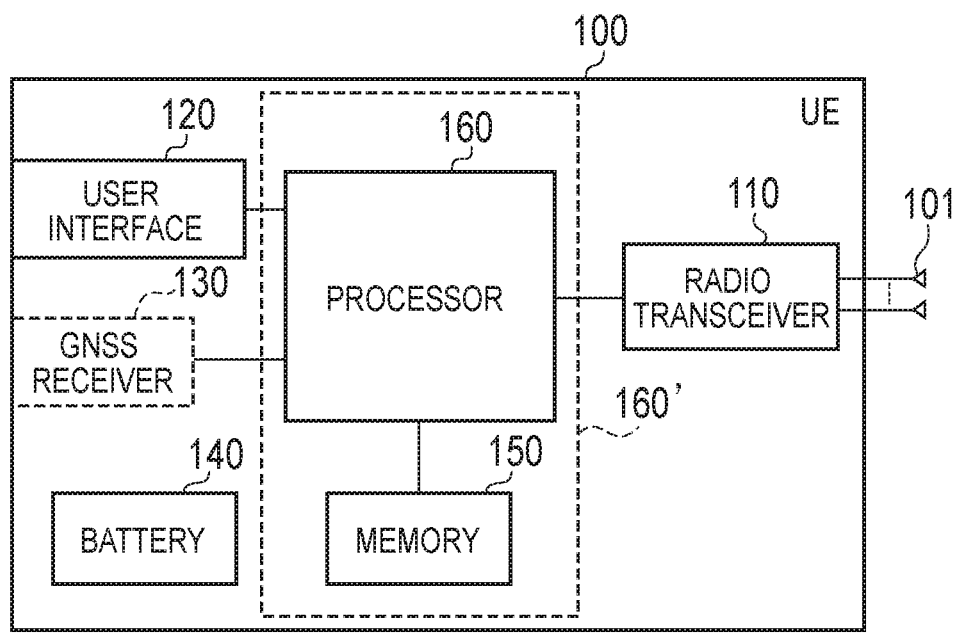
FIG. 2 is a block diagram illustrating a UE according to the first to third embodiments.

FIG. 2 is a block diagram illustrating the UE 100. The UE 100 includes a plurality of antennas 101, a radio transceiver 110, a user interface 120, a global navigation satellite system (GNSS) receiver 130, a battery 140, a memory 150, and a processor 160 as illustrated in FIG. 2. The memory 150 and the processor 160 constitute a controller. The UE 100 may not include the GNSS receiver 130. The memory 150 may be integrated with the processor 160, and this set (that is, a chip set) may be used as the processor 160'.

The antennas 101 and the radio transceiver 110 are used for transmission and reception of radio signals. The radio transceiver 110 converts a baseband signal (a transmission signal) output from the processor 160 into a radio signal and transmits the radio signal through the antennas 101. The radio transceiver 110 converts a radio signal received through the antennas 101 into a baseband signal (a reception signal) and outputs the baseband signal to the processor 160.

The user interface 120 is an interface with the user who carries the UE 100, and includes, for example, a display, a microphone, a speaker, various kinds of buttons, and the like. The user interface 120 receives an operation from the user, and outputs a signal indicating content of the operation to the processor 160. In order to obtain position information indicating a geographical position of the UE 100, the GNSS receiver 130 receives a GNSS signal and outputs the received signal to the processor 160. The battery 140 accumulates electric power to be supplied to the respective blocks of the UE 100.

The memory 150 stores a program executed by the processor 160 and information used for a process performed by the processor 160. The processor 160 includes a baseband processor that perform, for example, modulation, demodulation, encoding, and decoding of the baseband signal and a central processing unit (CPU) that performs various kinds of processes by executing the program stored in the memory 150. The processor 160 may include a codec that encodes and decodes audio and video signals. The processor 160 executes various kinds of processes which will be described later and various kinds of communication protocols.

Figure 3:
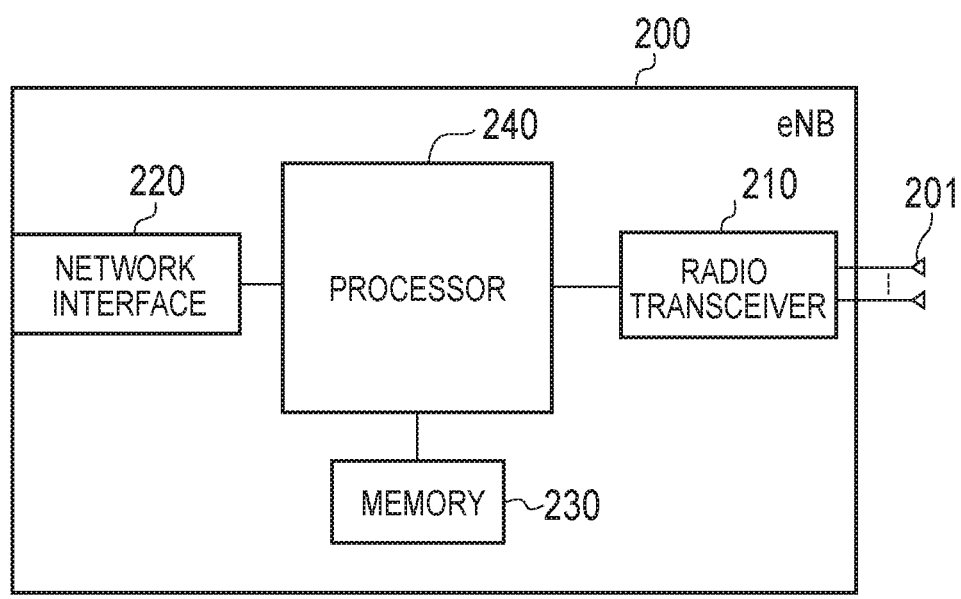
FIG. 3 is a block diagram illustrating an eNB according to the first to third embodiments.

FIG. 3 is a block diagram illustrating the eNB 200. The eNB 200 includes a plurality of antennas 201, a radio transceiver 210, a network interface 220, a memory 230, and a processor 240 as illustrated in FIG. 3. The memory 230 and the processor 240 constitute a controller. The memory 230 may be integrated with the processor 240, and this set (that is, a chip set) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal through the antenna 201. The radio transceiver 210 converts a radio signal received by the antenna 201 into a baseband signal (a reception signal), and outputs the baseband signal to the processor 240.

The network interface 220 is connected with a neighboring eNB 200 via the X2 interface and connected with the MME/S-GW 300 via the S1 interface. The network interface 220 is used for communication performed on the X2 interface and communication performed on the S1 interface.

The memory 230 stores a program executed by the processor 240 and information used for a process performed by the processor 240. The processor 240 includes a baseband processor that perform, for example, modulation, demodulation, encoding, and decoding of the baseband signal and a CPU that performs various kinds of processes by executing the program stored in the memory 230. The processor 240 executes various kinds of processes which will be described later and various kinds of communication protocols.

Figure 4:
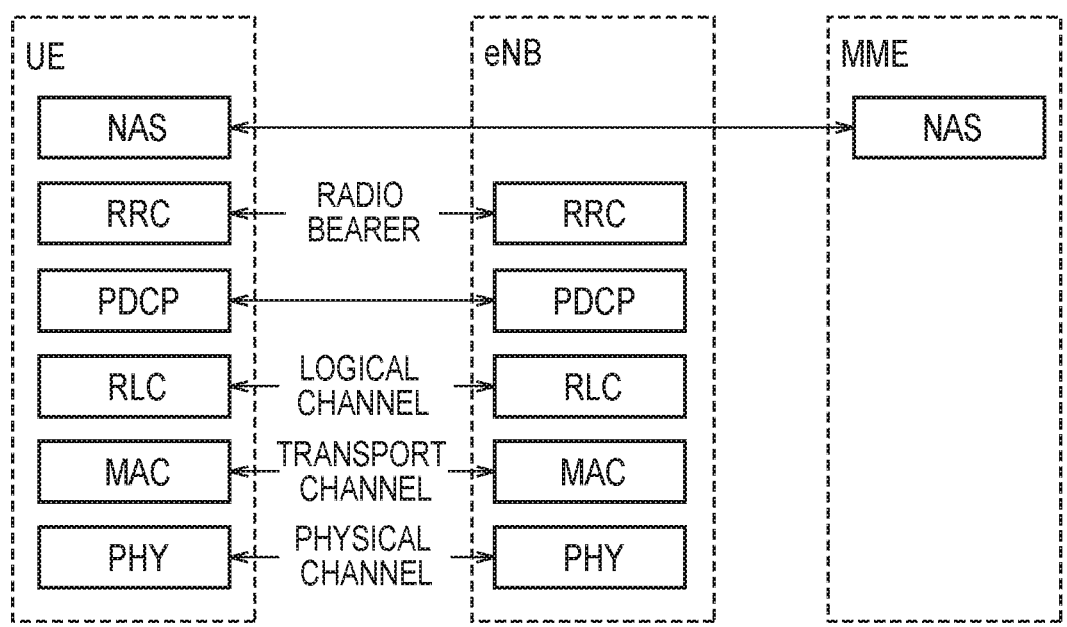
FIG. 4 is a protocol stack diagram of a radio interface according to the first to third embodiments.

FIG. 4 is a protocol stack diagram of a radio interface in the LTE system. A radio interface protocol is classified into first to third layers of an OSI reference model, and the first layer is a physical (PHY) layer as illustrated in FIG. 4. The second layer includes a medium access control (MAC) layer, a radio link control (RLC) layer, and a packet data convergence protocol (PDCP) layer. The third layer includes a radio resource control (RRC) layer.

The PHY layer performs encoding/decoding, modulation/demodulation, antenna mapping/demapping, and resource mapping/demapping. User data and control information are transmitted through a physical channel between the PHY layer of the UE 100 and the PHY layer of the eNB 200.

The MAC layer performs preferential control of data, a retransmission process by hybrid ARQ (HARQ), a random access sequence, and the like. User data and control information are transmitted through a transport channel between the MAC layer of the UE 100 and the MAC layer of the eNB 200. The MAC layer of the eNB 200 includes a scheduler for deciding transport formats (a transport block size and a modulation and coding scheme (MCS)) of an uplink and a downlink and a resource block to be allocated to the UE 100.

The RLC layer transmits data to an RLC layer of a reception side using the functions of the MAC layer and the PHY layer. User data and control information are transmitted through a logical channel between the RLC layer of the UE 100 and the RLC layer of the eNB 200.

The PDCP layer performs header compression/decompression and encryption/decryption.

The RRC layer is defined only in a control plane in which control information is dealt with. Control information (an RRC message) for various kinds of settings is transmitted between the RRC layer of the UE 100 and the RRC layer of the eNB 200. The RRC layer controls the logical channel, the transport channel, and the physical channel in response to establishment, re-establishment, and release of the radio bearer. When there is a connection (an RRC connection) between the RRC of the UE 100 and the RRC of the eNB 200, the UE 100 is in an RRC connected state, and otherwise, the UE 100 is in an RRC idle state.

A non-access stratum (NAS) layer positioned above the RRC layer performs session management, mobility management, and the like.

Figure 5:
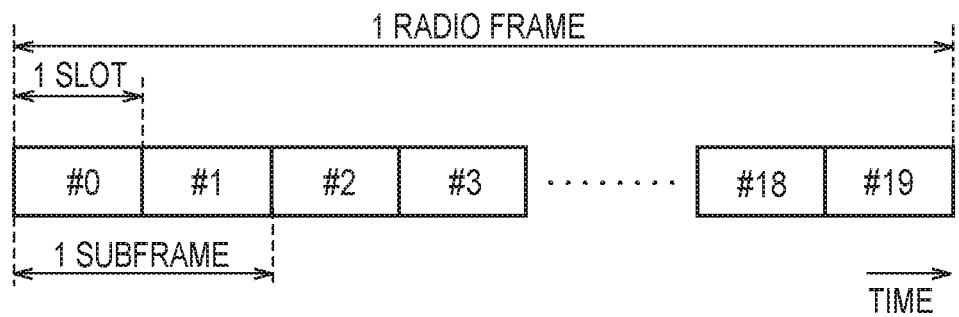
FIG. 5 is a diagram illustrating a radio frame according to the first to third embodiments.

FIG. 5 is a diagram illustrating a radio frame used in the LTE system. In the LTE system, Orthogonal Frequency Division Multiplexing Access (OFDMA) is applied for downlink, and Single Carrier Frequency Division Multiple Access (SC-FDMA) is applied for uplink.

A radio frame is configured with 10 subframes arranged in a time direction as illustrated in FIG. 5. Each subframe is configured with two slots arranged in the time direction. A length of each subframe is 1 ms, and a length of each slot is 0.5 ms. Each subframe includes a plurality of resource blocks (RBs) in a frequency direction and includes a plurality of symbols in the time direction. Each resource block includes a plurality of sub carriers in the frequency direction. One resource element (RE) is configured with one symbol and one sub carrier. Among radio resources (time and frequency resources) allocated to the UE 100, the frequency resources can be specified by resource blocks, and the time resources can be specified by subframes (or slots).

In the downlink, an interval of several symbols at the head of each subframe is a control region used as a physical downlink control channel (PDCCH) for transmitting control information mainly. The remaining interval of each subframe is a data region that can be used as a physical downlink shared channel (PDSCH) for transmitting user data mainly.

The eNB 200 transmits information (L1/L2 control information) for notifying of downlink and uplink resource allocation results to the UE 100 through the PDCCH. Each PDCCH occupies resources configured with one or more control channel elements (CCEs). One CCE is configured with a plurality of REs. One of 1, 2, 4, and 8 is set as the number of CCEs occupied by the PDCCH (an aggregation level).

The eNB 200 transmits a plurality of pieces of control information. The eNB 200 includes CRC bit scrambled using an identifier (Radio Network Temporary ID (RNTI)) of the UE 100 of a transmission destination in control information in order to identify the UE 100 of the transmission destination of each control information.

For a plurality of pieces of control information that may be directed to its own UE, each of the UEs 100 performs descrambling on the CRC bits using the RNTI of its own UE, performs blind decoding on the PDCCH, and detects the control information directed to its own UE.

In order to reduce the number of blind decodings, a CCE serving as a blind decoding target is limited. A CCE region serving as the blind decoding target is referred to as "search space." The search space will be described later in detail.

(2) Operation According to First Embodiment

The LTE system according to the first embodiment supports group communication. An operation for appropriately controlling the group communication according to the first embodiment will be described below.

(2.1) Operation Overview

Figure 6A:
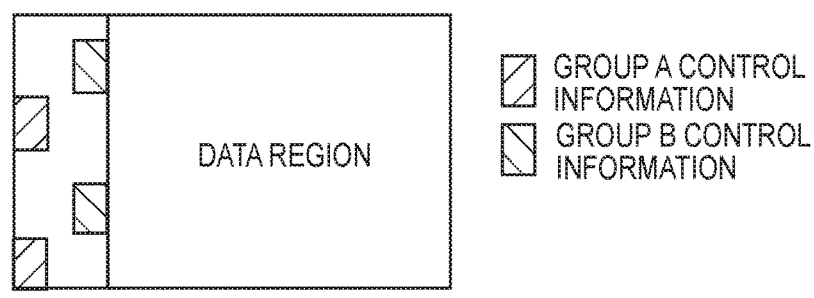
FIGS. 6(*a*) and 6(*b*) are diagrams for describing an operation according to the first embodiment.
Figure 6B:
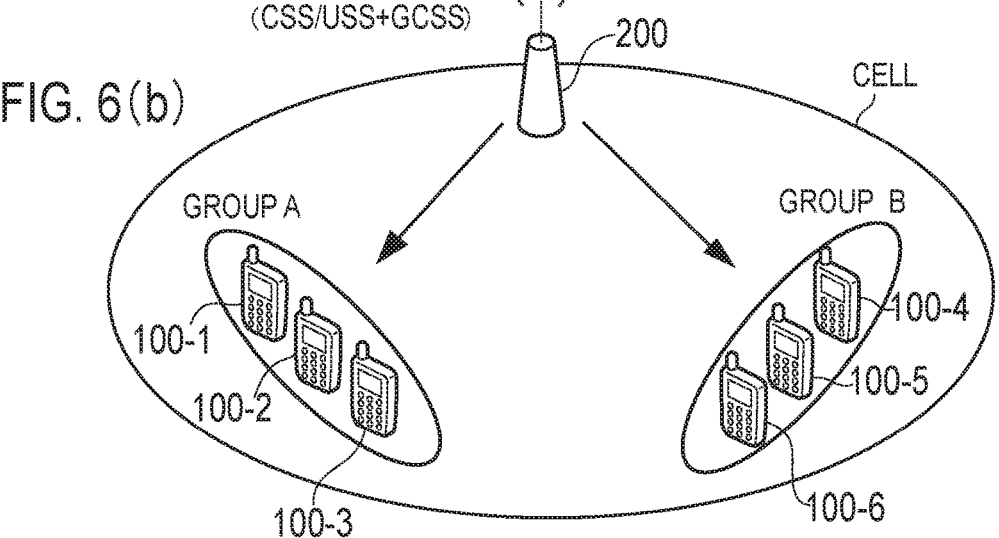

FIGS. 6(a) and 6(b) are diagrams for describing an operation according to the first embodiment. FIG. 6(a) illustrates a downlink subframe according to the first embodiment, and FIG. 6(b) illustrates an operation environment according to the first embodiment.

As illustrated in FIGS. 6(a) and 6(b), the LTE system according to the first embodiment includes an eNB 200 that manages a cell and transmits control information in a control region (a PDCCH region) in a downlink subframe and a plurality of UEs 100 that constitute a terminal group (hereinafter, referred to simply as a "group") that perform the group communication in the cell. Each group is identified by a service identifier (hereinafter, referred to as a "GC service ID"). FIGS. 6(a) and 6(b) illustrate an example in which UEs 100-1 to 100-3 belong to a group A, and UEs 100-4 to 100-6 belong to a group B.

Each of the UEs 100 is in the RRC connected state, and a different identifier (cell RNTI (C-RNTI)) is allocated from the eNB 200 to each UE 100 in the cell.

A group communication identifier (a group communication RNTI (GC-RNTI)) is allocated to each of the UEs 100 that perform the group communication. In the first embodiment, a different GC-RNTI is allocated to each of the UEs 100 for each group. In FIGS. 6(a) and 6(b), a GC-RNTI(A) is allocated to the UEs 100-1 to 100-3 belonging to the group A, and a GC-RNTI(B) is allocated to the UEs 100-4 to 100-6 belonging to the group B. An operation of allocating the GC-RNTI will be described later.

The PDCCH region includes a common search space (CSS) in which control information common to all the UEs 100 in the cell is arranged and a UE specific search space (USS) in which control information specific to each of the UEs 100 in the cell is arranged. The control information common to all the UEs 100 in the cell is, for example, allocation information related to a broadcast signal and a paging signal. The control information specific to each of the UEs 100 in the cell is, for example, allocation information related to downlink user data. The USS is set according to the C-RNIT, a subframe number, and the like.

In the first embodiment, the PDCCH region further includes a group communication search space (GCSS) in which group communication control information related to the group communication (hereinafter, referred to as "GC control information") is arranged. The GC control information is, for example, allocation information (information of an allocation resource block) related to downlink user data (group communication data). The GC control information may include information of the MCS. When semi-persistent scheduling is performed, information indicating a duration of an allocation resource block may be included. The GCSS is set according to the GC-RNTI, the subframe number, and the like. In the first embodiment, since the GC-RNTI differs according to each group, the GCSS differs according to each group as well. In FIGS. 6(a) and 6(b), the GCSS corresponding to the group A and the GCSS corresponding to the group B are individually set.

Hereinafter, a region in which the CSS is set in the PDCCH region is referred to as a "CSS region," a region in which the USS is set is referred to as a "USS region," and a region in which the GCSS is set is referred to as a "GCSS region."

The eNB 200 arranges the GC control information in the GCSS region according to the GC-RNTI. Specifically, the eNB 200 performs mapping of the GC control information for the group A in the GCSS corresponding to the group A, and performs mapping of the GC control information for the group B in the GCSS corresponding to the group B. The eNB 200 scrambles the GC control information for the group A using the GC-RNTI(A) allocated to the group A, and scrambles the GC control information for the group B using the GC-RNTI(B) allocated to the group B.

Each of the UEs 100 acquires the GC control information arranged in the GCSS according to the GC-RNTI allocated to its own UE 100. Specifically, each of the UEs 100 performs blind decoding (monitoring) of the GCSS corresponding to the group to which its own UE 100 belongs using the GC-RNTI allocated to its own UE 100. Then, each of the UEs 100 acquires the GC control information for the group to which its own UE 100 belongs through the blind decoding. For example, the UE 100-1 acquires the GC control information for the group A through the blind decoding of the GCSS corresponding to the group A. On the other hand, the UE 100-4 acquires the GC control information for the group B through the blind decoding of the GCSS corresponding to the group B.

As described above, in the first embodiment, since the GC-RNTI differs according to each group, the GC control information is transmitted within the PDCCH region. As a result, for example, a flexible (dynamic) radio resource allocation can be performed according to the number of groups, the group communication data amount, and the like for each group.

(2.2) GC-RNTI Allocation Operation

Next, a GC-RNTI allocation operation according to the first embodiment will be described.

(2.2.1) First Operation Pattern

In the first operation pattern, the eNB 200 or the core network (the EPC 20) decides the GC-RNTI according to a request from the UE 100 that attempts to start the group communication. The eNB 200 notifies the UE 100 of the request source of the decided GC-RNTI. For example, the eNB 200 transmits the GC-RNTI through an individual RRC message in the unicast manner. In this case, the GC-RNTI may be included in group communication setting information (Configuration).

FIG. 7 is a sequence diagram illustrating an operation when the eNB 200 allocates the GC-RNTI.

As illustrated in FIG. 7, in step S11, the UE 100 establishes an RRC connection with the eNB 200.

Thereafter, the UE 100 performs a group communication initiation process. In step S12, the UE 100 transmits a GC-RNTI allocation request (a GC control request) to the eNB 200. The GC control request includes the GC service ID of the group communication that the UE 100 desires to join.

In step S13, the eNB 200 that has received the GC control request derives the GCRNTI from the GC service ID included in the GC control request. The eNB 200 is assumed to receive a GC service ID list from the EPC 20 and associate the GC-RNTI with each group communication. For example, an association timing is a timing at which the GC service ID list is received from the EPC 20 or a timing at which the GC control request is received from the UE 100.

In step S14, the eNB 200 transmits a response (a GC control response) including the GC-RNTI corresponding to the GC service ID to the UE 100.

The UE 100 acquires and holds the GC-RNTI included in the GC control response. The UE 100 starts the blind decoding as the GC-RNTI is held.

Figure 8:
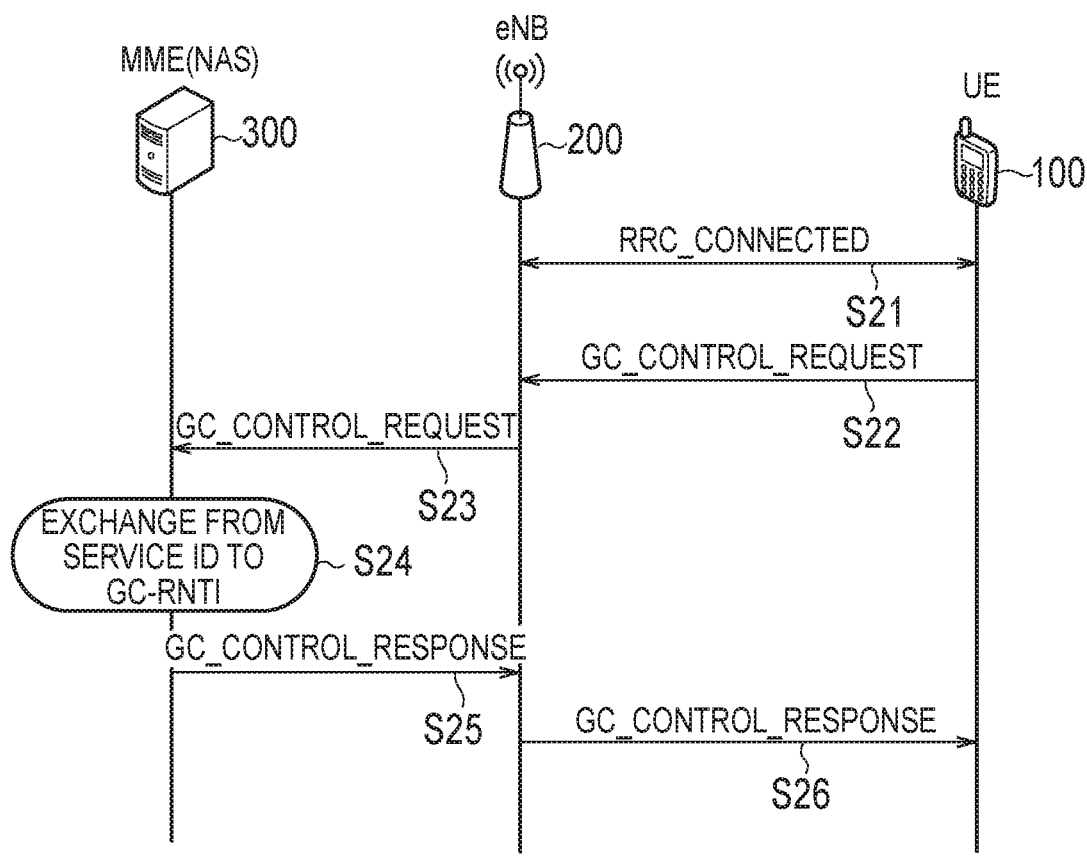
FIG. 8 is a sequence diagram illustrating an operation when an EPC allocates a GC-RNTI according to the first embodiment.

FIG. 8 is a sequence diagram illustrating an operation when the EPC 20 allocates the GC-RNTI. When the EPC 20 allocates the GC-RNTI, a plurality of eNBs 200 can operate in collaboration with one another. Here, an example in which an MME 300 in the EPC 20 allocates the GC-RNTI is illustrated.

As illustrated in FIG. 8, in step S21, the UE 100 establishes an RRC connection with the eNB 200.

Thereafter, the UE 100 performs a group communication initiation process. In step S22, the UE 100 transmits the GC-RNTI allocation request (the GC control request) to the eNB 200. The GC control request includes the GC service ID of the group communication that the UE 100 desires to join.

When the eNB 200 holds an association between the GC service ID and the GC-RNTI, the eNB 200 may allocates the GC-RNTI based on the association. Here, the eNB 200 is assumed not to hold the association. In step S23, the eNB 200 transfers the GC control request transmitted from the UE 100 to the MME 300.

In step S24, the MME 300 that has received the GC control request derives the GCRNTI from the GC service ID included in the GC control request.

In step S25, the MME 300 transmits a response (the GC control response) including the GC-RNTI corresponding to the GC service ID to the eNB 200.

In step S26, the eNB 200 that has received the GC control response transfers the GC control response to the UE 100. Further, when the GC-RNTI allocated by the MME 300 is identical to an RNTI allocated by its own eNB 200, the eNB 200 may request the MME 300 to change the allocation of the GC-RNTI.

The UE 100 acquires and holds the GC-RNTI included in the GC control response. The UE 100 starts the blind decoding as the GC-RNTI is held.

(2.2.2) Second Operation Pattern

In the first operation pattern, the eNB 200 notifies the UE 100 of the GC-RNTI in the unicast manner but may notify of the GC-RNTI in the broadcast manner.

In the second operation pattern, the eNB 200 transmits a message including a plurality of GC service IDs that differ according to each group and a plurality of GC-RNTIs corresponding to the plurality of GC service IDs within the cell in the broadcast manner. This message may be a common RRC message (for example, a system information block).

In the second operation pattern, the UE 100 that has received the message acquire the GC-RNTI corresponding to the GC service ID of the group communication that it desires to join from the message and holds the GC-RNTI. The UE 100 starts the blind decoding as the GC-RNTI is held.

(2.2.3) Range of GC-RNTI

Table 1 illustrates available RNTIs in the current specification and ranges of values thereof.

TABLE 1

| Value (hexa-decimal) | RNTI |
| --- | --- |
| 0000 | N/A |
| 0001–003C | RA-RNTI, C-RNTI, Semi-Persistent; |

TABLE 1-continued

| Value (hexa-decimal) | RNTI |
|---|---|
|  | Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

As shown in Table 1, an RNTI value has a range of 0000-FFFF. A "FFF4-FFFC" region reserved for the future use may be used as the range of the GC-RNTI value. Alternatively, a part of a "0001-003C" or "003D-FFF3" region may be allocated for the group communication. Alternatively, when a "0001-003C" or "003D-FFF3" region is used, it may be dynamically used, or a part may be cut for the GC-RNTI in advance.

(2.3) Group Communication Operation

Next, a group communication operation according to the first embodiment will be described. As described above, the eNB 200 allocates downlink radio resources for the group communication using, the GC-RNIT.

FIG. 9 is a sequence diagram illustrating a group communication operation according to the first embodiment. In FIG. 9, the UEs 100-1 to 100-3 are assumed to belong to the same group (the group A), and the GC-RNIT is assumed to have been allocated. The eNB 200 starts to allocate the downlink radio resources for the group communication according to a group communication delivery request transmitted from the EPC 20.

As illustrated in FIG. 9, in step S31, the eNB 200 performs mapping of the GC control information for the group A in the GCSS corresponding to the group A, and scrambles the GC control information for the group A using the GC-RNTI allocated to the group A. As described above, the GC control information is, for example, the allocation information (the information of the allocation resource block) related to the group communication data. The GC control information may include information of the MCS.

In step S32, the eNB 200 transmits the GC control information and the group communication data. When the dynamic resource allocation (dynamic scheduling) is performed, the group communication data is arranged in a resource block in a data region of a downlink subframe in which the GC control information is arranged. However, the eNB 200 may perform a semi-persistent resource allocation (semi-persistent scheduling).

In step S33, each of the UEs 100 acquires the GC control information arranged in the GCSS corresponding to the group A according to the GC-RNTI allocated to its own UE 100. Specifically, each of the UEs 100 performs the blind decoding (monitoring) of the GCSS corresponding to the group to which its own UE 100 belongs using the GC-RNTI allocated to its own UE 100. Each of the UEs 100 acquires the GC control information for the group to which its own UE 100 belongs through the blind decoding.

In step S34, each of the UEs 100 receives the group communication data based on the acquired GC control information. Specifically, each of the UEs 100 demodulates and decodes the group communication data arranged in the resource block indicated by the GC control information.

(3) Conclusion of First Embodiment

In the first embodiment, the eNB 200 arranges the GC control information in the GCSS region according to the GC-RNTI. Each of the UEs 100 acquires the GC control information arranged in the GCSS according to the GC-RNTI allocated to its own UE 100. As a result, the dynamic scheduling in the group communication can be implemented.

Further, it is possible to collectively allocate the resource blocks to a plurality of UEs 100 belonging to one group and collectively transmit (that is, multicast) the group communication data to a plurality of UEs 100 through the resource blocks. Thus, the radio resources can be efficiently used.

[First Modified Example of First Embodiment]

The first embodiment has been described in connection with the example in which the GC-RNTI differs according to each group. In this case, it is necessary to secure a plurality of GC-RNTIs and a plurality of GCSSs, and resources are likely to be tight. Thus, one GC-RNTI may be shared by the respective groups instead of causing the GC-RNTI to differ according to each group.

In the first modified example of the first embodiment, the GC-RNTI is a fixed value that is specified on a system in advance. Thus, the GC-RNTI is common to all groups. In this case, the GC control information includes information for receiving radio resources included in the data region other than the PDCCH region in the downlink subframe. This information includes the information of the allocation resource block, the information of the MCS, and the like. When the semi-persistent scheduling is performed, information indicating the duration of the allocation resource block may be further included.

In the first modified example of the first embodiment, the user data or the control information is arranged in the radio resources indicated by the GC control information together with the GC service ID. In other words, the GC control information is common to the respective groups and cut for each group based on the GC service ID in the data region.

Figure 10A:
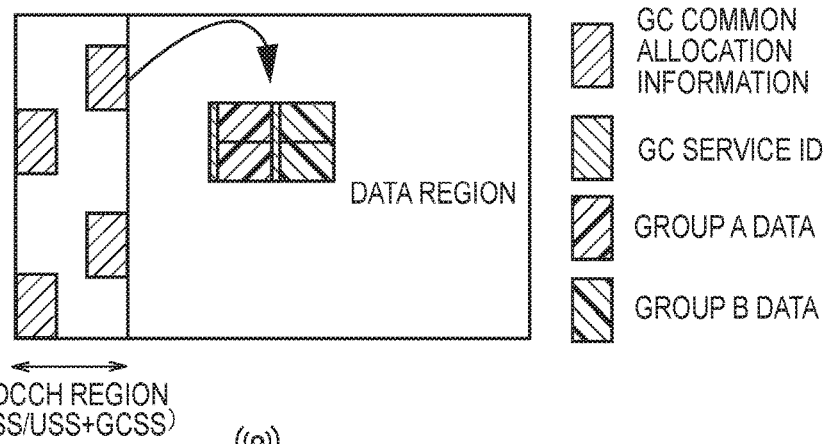
FIGS. 10(a) and 10(b) are diagrams illustrating a first operation pattern according to a first modified example of the first embodiment.
Figure 10B:
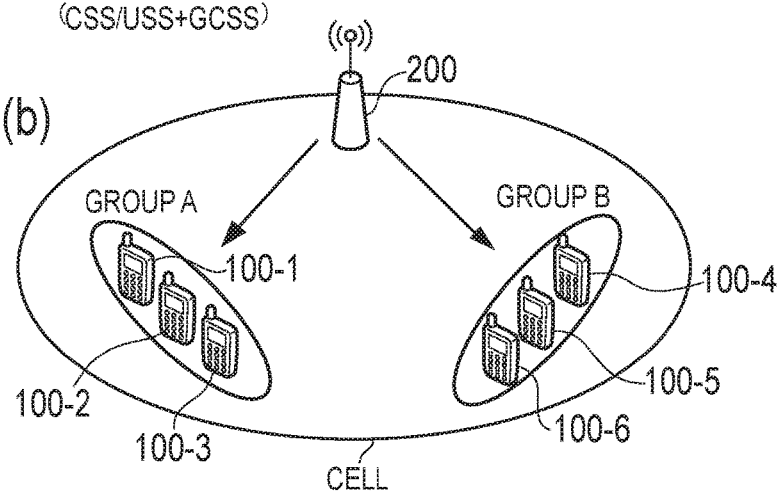

FIGS. 10(a) and 10(b) are diagrams illustrating a first operation pattern according to the first modified example of the first embodiment. In the first operation pattern, the user data is arranged in the radio resources indicated by the GC control information together with the GC service ID.

As illustrated in FIGS. 10(a) and 10(b), the eNB 200 arranges the GC control information in the GCSS region according to the GC-RNTI. The GC-RNTI is common to the groups A and B, and thus the GCSS is also common to the groups A and B. The eNB 200 scrambles the GC control information using the GC-RNTI.

The eNB 200 allocates the radio resources in the data region to the UEs 100 belonging to the groups A and B. In the first operation pattern, the eNB 200 arranges the GC service ID of the group A, the GC service ID of the group B, the group communication data of the group A, and the group communication data of the group B in the radio resources. Here, the group communication data of the group A is associated with the GC service ID of the group A. The group communication data of the group B is associated with the GC service ID of the group B. For example, a corresponding GC service ID is added to the head of the group communication data.

The UE 100 acquires the GC control information in the GCSS using the GC-RNIT allocated to its own UE 100. The UE 100 specifies allocation radio resources in the data region based on the GC control information, acquires the GC service ID included in the specified radio resources, and detects the GC service ID corresponding to the group communication in which its own UE 100 is taking part. Then, the UE 100 acquires the group communication data associated with the detected GC service ID.

Figure 11A:
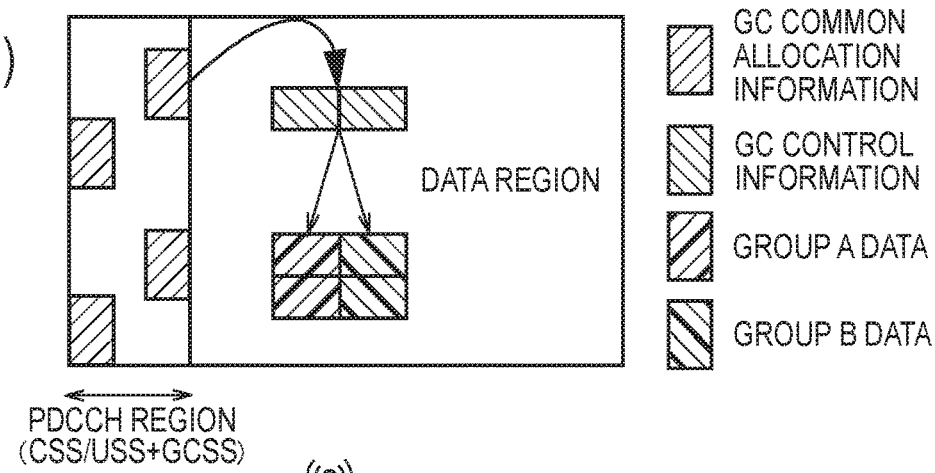
FIGS. 11(a) and 11(b) are diagrams illustrating a second operation pattern according to a first modified example of the first embodiment.
Figure 11B:
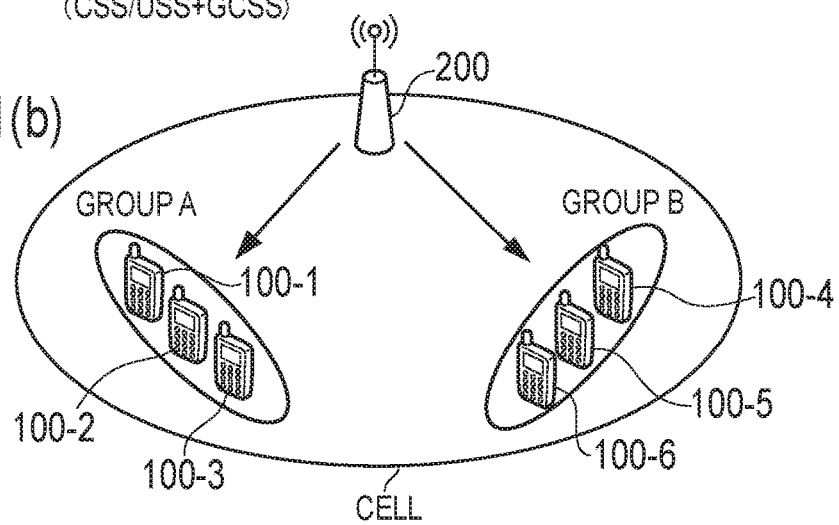

FIGS. 11(*a*) and 11(*b*) are diagrams illustrating a second operation pattern according to the first modified example of the first embodiment. In the second operation pattern, the control information is arranged in the radio resources indicated by the GC control information together with the GC service ID.

As illustrated in FIGS. 11(*a*) and 11(*b*), the eNB 200 arranges the GC control information in the GCSS region according to the GC-RNTI. The GC-RNTI is common to the groups A and B, and thus the GCSS is also common to the groups A and B. The eNB 200 scrambles the GC control information using the GC-RNTI.

In the second operation pattern, the eNB 200 allocates radio resources in which the control information is arranged, radio resources in which the group communication data of the group A is arranged, and radio resources in which the group communication data of the group B is arranged in the data region.

The eNB 200 arranges control information (A) including the GC service ID of the group A and control information (B) including the GC service ID of the group B in the radio resources in which the control information is arranged. The control information (A) is scheduling information related to the radio resources in which the group communication data of the group A is arranged. The control information (B) is scheduling information related to the radio resources in which the group communication data of the group B is arranged. The control information (A) and (B) may include the information of the MCS. Further, when the semi-persistent scheduling is performed, the control information (A) and (B) may further include information the duration of the allocation resource block.

The UE 100 acquires the GC control information in the GCSS using the GC-RNIT allocated to its own UE 100. The UE 100 specifies the radio resources in the data region based on the GC control information, and acquires the control information included in the specified radio resources. Here, the UE 100 detects the control information including the GC service ID corresponding to the group communication in which its own UE 100 is taking part. Then, the UE 100 specifies the radio resources indicated by the detected control information, and acquires the group communication data included in the specified radio resources.

[Second Modified Example of First Embodiment]

In the second modified example of the first embodiment, an example in which the UE 100 that performs the group communication performs a discontinuous reception (DRX) operation is assumed. The UE 100 that performs the DRX operation monitors control information in a first ON period in which control information different from the GC control information is received, and monitors the GC control information in a second ON period in which the GC control information is received.

FIGS. 12(*a*) to 12(*c*) are timing charts illustrating an operation according to the second modified example of the first embodiment.

As illustrated in FIG. 12(*a*), the UE 100 that performs the DRX operation monitors the control information different from the GC control information such as the control information transmitted using the C-RNTI in an ON period of a DRX cycle. Specifically, the receiver (the radio transceiver 110) is turned at intervals of the DRX cycles, and the blind decoding of the PDCCH region is performed using the C-RNTI.

Here, when the group communication is allocated discontinuously (periodically), the UE 100 needs to turn on the receiver in the ON period in which the GC control information is received as well as the ON period illustrated in FIG. 12(*a*) as illustrated in FIG. 12(*b*). Thus, as illustrated in FIG. 12(*c*), the UE 100 performs control the receiver is turned on in the ON period illustrated in FIG. 12(*a*) and the ON period illustrated in FIG. 12(*b*).

[Second Embodiment]

A second embodiment will be described focusing on a difference with the first embodiment. A system configuration according to the second embodiment is the same as in the first embodiment.

In the first embodiment, the GC control information is arranged in the GCSS region. On the other hand, in the second embodiment, the GC control information is arranged in the CSS region without disposing the GCSS region.

Figure 13A:
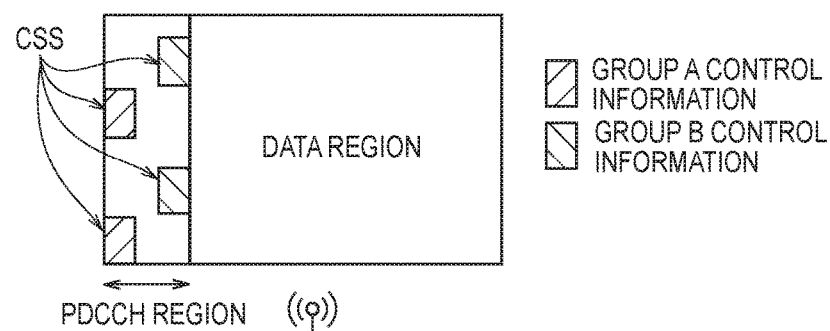
FIGS. 13(a) and 13(b) are diagrams for describing an operation according to the second embodiment.
Figure 13B:
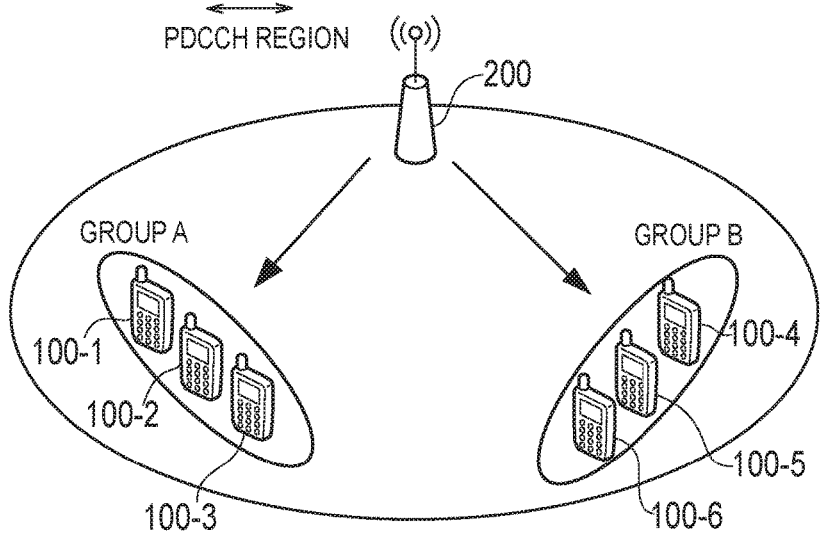

FIGS. 13(*a*) and 13(*b*) are diagrams for describing an operation according to the second embodiment.

As illustrated in FIGS. 13(*a*) and 13(*b*), the eNB 200 arranges the GC control information related to the group communication in the CSS according to the GC-RNTI allocated to each group. Here, the eNB 200 scrambles the GC control information using the GC-RNTI.

Specifically, the eNB 200 performs mapping of the GC control information for the group A in the CSS corresponding to the group A, and performs mapping of the GC control information for the group B in the CSS corresponding to the group B. The eNB 200 scrambles the GC control information for the group A using the GC-RNTI(A) allocated to the group A, and scrambles the GC control information for the group B using the GC-RNTI(B) allocated to the group B.

The eNB 200 also arranges the control information common to all the UEs 100 in the cell in the CSS. The eNB 200 scrambles the common control information, for example, using an SI-RNTI and/or a P-RNTI.

Each of the UEs 100 acquires the GC control information arranged in the CSS according to the GC-RNTI allocated to its own UE 100. Specifically, each of the UEs 100 performs the blind decoding (monitoring) of the GCSS corresponding to the group to which its own UE 100 belongs using the GC-RNTI allocated to its own UE 100. Then, each of the UEs 100 acquires the GC control information for the group to which its own UE 100 belongs through the blind decoding.

The remaining points are similar to those in the first embodiment. Specifically, in the second embodiment, the GC-RNTI differs according to each group in which the group communication is performed in the cell.

The eNB 200 or the core network decides the GC-RNTI according to the request of the UE 100 that desires to start the group communication. The eNB 200 notifies the UE 100 of the request source of the decided GC-RNTI.

Alternatively, the eNB 200 transmits a message including a plurality of GC service IDs that differ according to each group and a plurality of GC-RNTIs corresponding to the plurality of GC service IDs within the cell in the broadcast manner.

[Modified Example of Second Embodiment]

The second embodiment has been described in connection with the example in which the GC-RNTI differs according to each group. However, similarly to the first modified example of the first embodiment, one GC-RNTI may be shared by the respective groups.

[Third Embodiment]

A third embodiment will be described focusing on a difference with the first embodiment. A system configuration according to the second embodiment is the same as in the first embodiment.

In the first embodiment, the GC control information is arranged in the GCSS region. On the other hand, in the third embodiment, the GC control information is arranged in the USS region without disposing the GCSS region.

Figure 14A:
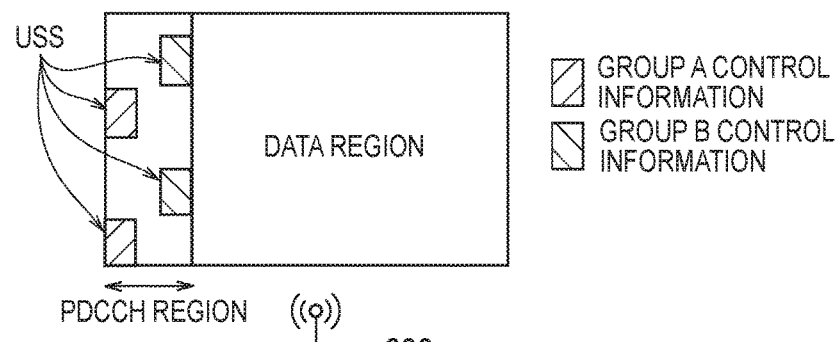
FIGS. 14(a) and 14(b) are diagrams for describing an operation according to the third embodiment.
Figure 14B:
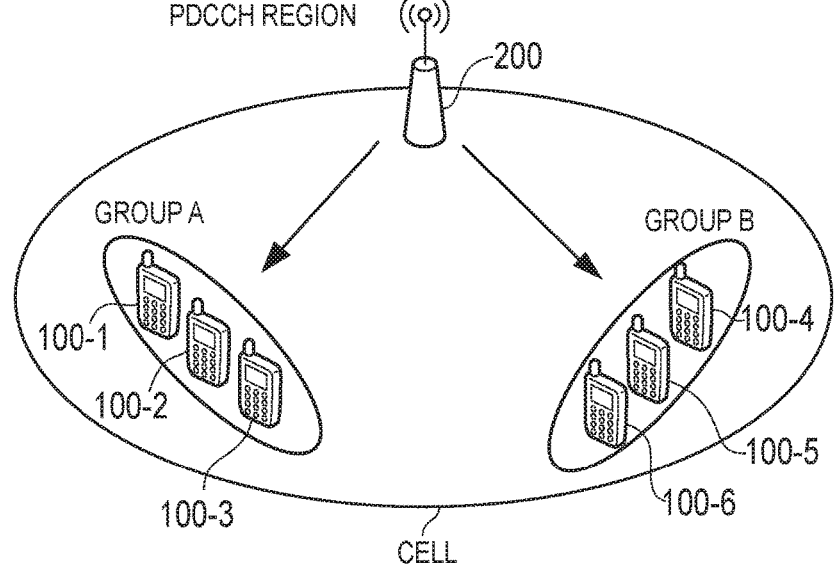

FIGS. 14(a) and 14(b) are diagrams for describing an operation according to the third embodiment.

As illustrated in FIGS. 14(a) and 14(b), the eNB 200 arranges the GC control information related to the group communication in the USS according to the GC-RNTI allocated to each group. Here, the eNB 200 scrambles the GC control information using the GC-RNTI.

Specifically, the eNB 200 performs mapping of the GC control information for the group A in the USS corresponding to the group A, and performs mapping of the GC control information for the group B in the USS corresponding to the group B. The eNB 200 scrambles the GC control information for the group A using the GC-RNTI(A) allocated to the group A, and scrambles the GC control information for the group B using the GC-RNTI(B) allocated to the group B.

Each of the UEs 100 acquires the GC control information arranged in the USS according to the GC-RNTI allocated to its own UE 100. Specifically, each of the UEs 100 performs the blind decoding (monitoring) of the GUSS corresponding to the group to which its own UE 100 belongs using the GC-RNTI allocated to its own UE 100. Then, each of the UEs 100 acquires the GC control information for the group to which its own UE 100 belongs through the blind decoding.

The remaining points are similar to those in the first embodiment. Specifically, in the third embodiment, the GC-RNTI differs according to each group in which the group communication is performed in the cell.

The eNB 200 or the core network decides the GC-RNTI according to the request of the UE 100 that desires to start the group communication. The eNB 200 notifies the UE 100 of the request source of the decided GC-RNTI.

Alternatively, the eNB 200 transmits a message including a plurality of GC service IDs that differ according to each group and a plurality of GC-RNTIs corresponding to the plurality of GC service IDs within the cell in the broadcast manner.

[First Modified Example of Third Embodiment]

The third embodiment has been described in connection with the example in which the GC-RNTI differs according to each group. However, similarly to the first modified example of the first embodiment, one GC-RNTI may be shared by the respective groups.

[Second Modified Example of Third Embodiment]

In the third embodiment, similarly to the second modified example of the first embodiment, the UE 100 that performs the DRX operation monitors control information in the first ON period in which control information different from the GC control information is received, and monitors the GC control information in the second ON period in which the GC control information is received.

[Other Embodiments]

The above embodiments have been described in connection with the example in which each of the UEs 100 belongs to one group, but one UE 100 may belong to a plurality of groups. In this case, one UE 100 may hold a plurality of GC-RNTIs.

In the above embodiments, the LTE system has been described as an example of the mobile communication system, but the present disclosure is not limited to the LTE system and may be applied to any other system than the LTE system.

The invention claimed is:

1. A user terminal configured to communicate with a base station, comprising:
   a controller configured to execute a first discontinuous reception (DRX) operation and a second DRX operation, wherein
   the first DRX operation is an operation of discontinuously monitoring first control information, which is transmitted from the base station via a physical downlink control channel (PDCCH), using a cell-radio network temporary identifier (C-RNTI) that uniquely identifies the user terminal in a cell of the base station,
   the second DRX operation is an operation of discontinuously monitoring second control information, which is transmitted from the base station via the PDCCH, using a group RNTI assigned to a terminal group including the user terminal,
   the controller is configured to monitor the first control information in a first ON duration for the first DRX operation, and to monitor the second control information in a second ON duration for the second DRX operation, the second ON duration being independent of the first ON duration,
   the controller is further configured to execute a process of receiving third control information, which is transmitted from the base station via the PDCCH, using a fixed RNTI that predefined in a system, wherein the third control information includes information indicating allocation of physical downlink shared channel (PDSCH) resources, the PDSCH resources including:
      a plurality of service identifiers, wherein each service identifier identifies a multicast service provided by the base station; and
      plural pieces of scheduling information corresponding to the service identifiers on a one-to-one basis, and
   the controller is further configured to receive the service identifiers and the plural pieces of scheduling information, based on the third control information received using the fixed RNTI.

2. A device to be equipped in a user terminal configured to communicate with a base station, comprising:
   at least one processor communicatively coupled to a memory, the at least one processor configured to execute a first discontinuous reception (DRX) operation and a second DRX operation, wherein
   the first DRX operation is an operation of discontinuously monitoring first control information, which is transmitted from the base station via a physical downlink control channel (PDCCH), using a cell-radio network temporary identifier (C-RNTI) that uniquely identifies the user terminal in a cell of the base station,
   the second DRX operation is an operation of discontinuously monitoring second control information, which is transmitted from the base station via the PDCCH, using a group RNTI assigned to a terminal group including the user terminal,
   the at least one processor is configured to monitor the first control information in a first ON duration for the first DRX operation, and to monitor the second control information in a second ON duration for the second DRX operation, the second ON duration being independent of the first ON duration, the at least one processor is further configured to execute a process of receiving third control information, which is transmitted from the base station via the PDCCH, using a fixed RNTI that predefined in a system, wherein the third control information includes information indicating allocation of physical downlink shared channel (PDSCH) resources, the PDSCH resources including:
   a plurality of service identifiers, wherein each service identifier identifies a multicast service provided by the base station; and
   plural pieces of scheduling information corresponding to the service identifiers on a one-to-one basis, and
the at least one processor is further configured to receive the service identifiers and the plural pieces of scheduling information, based on the third control information received using the fixed RNTI.

* * * * *